United States Patent
Williams et al.

(10) Patent No.: US 6,398,425 B2
(45) Date of Patent: Jun. 4, 2002

(54) SELF ALIGNING OPTICAL INTERCONNECT WITH MULTIPLE OPTO-ELECTRONIC DEVICES PER FIBER CHANNEL

(75) Inventors: Richard J. Williams, Hollis; Mani Sundaram, Nashua, both of NH (US)

(73) Assignee: Teraconnect, Inc, Nashua, NH (US)

( * ) Notice: Subject to any disclaimer, the term of this patent is extended or adjusted under 35 U.S.C. 154(b) by 0 days.

(21) Appl. No.: 09/851,714

(22) Filed: May 9, 2001

Related U.S. Application Data

(63) Continuation-in-part of application No. 09/840,609, filed on Apr. 23, 2001.
(60) Provisional application No. 60/202,800, filed on May 9, 2000, and provisional application No. 60/202,600, filed on May 9, 2000.

(51) Int. Cl.$^7$ .................................................. G02B 6/36
(52) U.S. Cl. .............................. 385/89; 385/88; 385/24; 359/159
(58) Field of Search .................................. 385/88.24, 89, 385/90, 129–132, 147; 359/154, 159, 173

(56) References Cited

U.S. PATENT DOCUMENTS

| | | |
|---|---|---|
| 5,359,447 A | 10/1994 | Hahn et al. |
| 5,631,988 A * | 5/1997 | Swirhun et al. .............. 385/89 |
| 5,696,862 A | 12/1997 | Hauer et al. |
| 5,858,841 A | 1/1999 | Hsu |
| 5,912,913 A | 6/1999 | Kondow et al. |
| 5,978,401 A | 11/1999 | Morgan |

OTHER PUBLICATIONS

Wipiejewski et al., "Vertical–Cavity Surface–Emitting Laser Diodes for Short Distance Optical Fiber Networks" Electronic Components and Technology Conference, 1994, pp. 330–334.*

PCT International Search Report dated Oct. 30, 2001 of International Application No. PCT/US01/14957 filed May 9, 2001.

* cited by examiner

*Primary Examiner*—Phan T. H. Palmer
(74) *Attorney, Agent, or Firm*—Scott J. Asmus; Vernon C. Maine

(57) ABSTRACT

A method for alignment in software and supporting circuitry of the optical transmitters and receivers to their respective optical channels at each connection of a multi-channel optical link to an optical planar array, permits non-critical physical alignment of the connector to the optical array. The steps include: employing a connector and optical array configuration at each connection in which there are several optical devices within the illumination area of each channel at the connector/array interface, employing supporting circuitry and software that has control of all optical devices associated with the optical link, enabling all receivers, turning on the transmitters sequentially, recording which of the receivers is responding, comparing matching receiver sets for each transmitter to identify associated transmitter sets and channels.

15 Claims, 2 Drawing Sheets

SELF ALIGNING OPTICAL INTERCONNECT WITH MULTIPLE OPTO-ELECTRONIC DEVICES PER FIBER CHANNEL

CROSS REFERENCE TO RELATED APPLICATIONS

This application relates and claims priority for all purposes to pending U.S. application Ser. Nos. 60/202,800, and 60/202,600, both filed May 9, 2000, and is a continuation-in-part of Ser. No. 09/840,609, filed Apr. 23, 2001.

BACKGROUND OF THE INVENTION

1. Technical Field of the Invention

This invention most generally relates to the alignment of planar arrays of electro-optical devices with optical link connectors used for multi-channel optical data communications; and more particularly to a method for mapping the result of a non-critical physical alignment of an optical array to a multi-channel optical link connector where multiple electro-optical devices are available for each optical channel.

2. Background Art

Integrated circuit technology allows large numbers of VCSEL (Vertical Cavity Surface Emitting Laser) laser emitter optical transmitters and p-i-n diode photo detector optical receivers to be constructed as large, two dimensional planar arrays, with one or more such arrays mounted on a common ASIC (Application Specific Integrated Circuit) substrate, as by flip-chip methods, also known as hybridization mounting techniques, each emitter and/or detector of the array making electrical connections with circuitry previously constructed in the ASIC substrate. This compound device, when coupled with precision alignment to a terminal end or node of a multi-channel optical link such as the end of a fiber optic bundle, provides an electro/optical communications interface where an electronic signal is converted by a VCSEL to an optical signal, directed at a end face of a single channel optical core of a terminator/connector, and hence along an optical transmission path fiber within the bundle, to be discharged via a carefully aligned receiving end fiber terminator/connector into a photo diode opto-electronic receiver on the same or another optical array of the same or another ASIC substrate, and converted by that photo detector back into an electronic signal. Fiberoptic communications channels provide significantly greater speed and effective bandwidth capabilities as compared to electrically conductive leads.

Each core end of the optical fiber bundle terminator or connector must be carefully aligned with its VCSEL on one end and corresponding detector on the end in order for the optical communications channel to be effective. Light pipes and image guides are commonly used to terminate a fiber bundle and connect the individual light fibers to their respective optical elements in planar photo arrays. These must be carefully aligned without actual contact and mechanically fastened to the planar array or its ASIC substrate so as to maintain optical alignment. Sufficient misalignment between the optical face of the array and the terminator face, in any of the Z-axis parameters of lateral offset, rotation, tilt, and spacing as between a multi-channel fiber terminator and a photo optic array, can cause a significant number of optical channels to be unusable.

As the density of the arrays of emitters and detectors increases, coupling a multi-channel fiber optic cable, image guide, or other optical connector or terminating device to the transceiver array becomes an increasingly more arduous task. Lateral offset and rotation alignment are particularly burdensome, while spacing and tilt alignment are more easily controlled with proper mechanical connectors and spacing structures.

Two intuitive methods for aligning an optical fiber array to its respective electro-optical array to achieve accurate device-to-channel alignment, should be noted. The fabricator may simply observe the electro-optical devices through a part of the connector and visually or "passively" align target reference points of the components, perhaps with the aid of a transparent fiber alignment faceplate or template. Another method is to interconnect all of the various electrical and optical assemblies and perform "active" final physical alignment of the multi-channel fiber connector to the optical array so as to optimize the multi-channel connection as seen at the detector side of the optical link, and then secure the connector to the optical array or its ASIC substrate in that precise position. In either event, each such connection requires a closely controlled, precise step in the assembly process that contributes to the time and cost to assemble devices employing this technology.

SUMMARY OF THE INVENTION

It is an objective of the invention to provide a method for determining the alignment of a multi-channel optical link connector to a planar optical array.

It is another objective of the invention to provide a method for determining the alignment of each of the channels of a multi-channel optical link connector to the optical devices on a planar optical array.

It is a further objective to provide a method for determining the alignment of both ends of each of the channels of a multi-channel optical link to the optical devices of respective planar optical arrays.

For proper performance of electro-optical planar array devices used to provide data communications over optical links, it is essential that there is sufficient control over the alignment of the optical array face with respect to the optical link connector to assure an effective optical communications channel is present between identifiable sets of emitters and detectors. This invention desensitizes the precision required of the physical alignment of a multi-channel fiber optic link connector to the optical planar array face as compared to the one to one correspondence between an optical fiber termination and an optical device as used in the prior art.

The invention depends on using undersampling techniques that assume each fiber will be optically connected to several emitters on one end and/or several detectors on the other end, in combination with an automated mapping of the physical alignment of a non-precision connection which sorts out the available channels of the optical link and the emitter sets and detector sets common to each channel. This self-determination methodology of alignment provides data that then permits selection and de-selection from among the individual emitters and detectors on each array in accordance with various schemes for optimizing the performance of each channel of the communications link.

VCSELs can be produced in planar arrays by several methods. Ion-implanted VCSELs can be made with a diameter ranging from 20 to 100 microns. Oxide VCSELs can range from 20 to 60 microns. Etched-post VSCEL arrays are now feasible with VCSEL diameters of 5 to 40 microns; and with a 2 micron wide trench, can have a pitch as small as about 7 microns. This provides the potential for a significant planar face density of optical devices per fiber channel, using, for example, 50 or 62.5 micron diameter fiber cores terminated in a suitable connector.

Summarizing the technique of the invention for the simpler case, during the self-alignment of an under-sampled transmitter array to the fiber bundle, the transmitters devices are activated, for example in a rastering mode, while the detector array receiving the time-related impulses, and its controlling software embedded in the underlying ASIC or in the ASIC in combination with remote circuitry and software, map the unique set of adjacent transmitters producing a respond in each detector. If the detector array is connected on a one to one basis with the fibers or optical channels of the optical link, then the emitter set for that channel has been identified, in effect establishing the result of the physical alignment and mounting of the fiber optic connector to the transmitter array.

The use of multiple emitters per channel, along with the self-determined alignment information, provides further opportunities for individual selection, de-selection and control of the emitters within the set to optimize the use of each channel. As will be readily apparent to those skilled in the art, the corresponding methodology and the further opportunity for the case of an under-sampled receiver array is quite similar, except that detector sets for each emitter channel are identified, and subsequent control of detectors can be exercised for optimizing channel performance.

In the simplest case, for determining which detectors have been excluded from all possible channels by the particular physical connection of a multi-channel optical link to a detector array, as made during fabrication, the all-channels to all detectors alignment can be accomplished by simply illuminating the other, input end of the optical link with an expanded beam of suitable wavelength so that detectors adequately coupled to any channel will respond and be recognized.

A logical further scenario is where there are multiple optical devices at each end of each fiber channel. They may, of course, be on the same optical chip, on different optical chips on the same ASIC substrate, or on optical chips on different ASIC substrates. The invention also extends to chips of any sort that may integrate the ASIC and electro-optical surface arrays for both intra-chip and inter-chip optical communication, where assembly requires physical alignment of a multi-channel optical link connector to at least one planar array of optical devices on the chip, or as in this case, with both ends of the multi-channel link connected each to a planar array of optical devices.

In this case, the automatic self-determination alignment methodology of the invention requires the following steps:

1. Interconnect two planar arrays of very small electro-optical devices of photo-emitters and detectors with a multi-channel fiberoptic bundle, or optical link, where each end of the bundle is terminated by a suitable connector, each of which is attached to one of the arrays, so that each fiber of the bundle is linked to or "sees" at one end several electro-optical emitters on one array and is linked to or "sees" at its other end several electro-optical detectors on the other array. The interconnect step in this case is a relatively non-precise physical operation with respect to lateral offset and rotation, but is still sufficiently precise to assure proper Z-axis spacing and tilt tolerances of the optical link connectors to the optical arrays. It does not depend on critical alignment of channels to respective optical devices, but rather on overall array to connector edge alignment, since it is not necessary to establish an exact alignment or to achieve a pre-determined optical device-to-channel alignment at this stage.

2. Enable all of the detectors on the receiver array, or on both arrays or each array in turn if using transceiver arrays. This is done through ASIC or ASIC in combination with remote control circuitry and software.

3. Raster or otherwise sequence the individual photo emitters of the transmitter array, or on both arrays or each array in turn if using transceiver arrays. This is likewise done through ASIC or ASIC in combination with remote control circuitry and software.

4. Record the particular detectors illuminated with respect to each emitter in turn. When an emitter device of the transmitting array is on, only those detectors that are aligned with the same optical fiber serving that emitter will have useful sensitivity. Blanket illumination of the detector arrays is prevented because of the occulting portions of the optical fiber array. The effect is the same for an ordered fiber bundle or a more common over-sampling image guide. The ability to monitor and record or "map" the detector response is resident within the local ASIC, or is shared with remote control circuitry and software.

5. Establish, again through the ASIC or in combination with remote control circuitry and software, the detector sets of adjacent detectors common to each emitter as seen through the optical link.

6. Match up common sets of detectors to identify emitter sets of adjacent emitters using a common optical channel, again through the ASIC or in combination with remote control circuitry and software.

The methodology may be extended to mapping and recording the intensity or signal strength of each emitter/detector pair within a given optical channel, so that there may be a suitable initial selection from among the emitters and detectors of associated emitter and detector sets using the same channel that optimizes that channel of the communication link. The channel's emitter/detector pairs intensity map can be periodically compared to a fresh mapping of channel intensity, for possible re-selection of suitable emitters and detectors from amount those available.

A further benefit of the undersampling and mapping scheme is that spare emitters and detectors within the channel are available, should there be a failure of one of these optical devices. The methodology supports the implementation of differential optical signals in a given channel, using selective combinations of available emitters and detectors from among the emitter and detector sets of the channel.

On a larger scale, the methodology of the invention provides for periodic or automatic alignment assessments of the connector to the optical planar array to guard against creeping physical re-alignment due to environmental effects such as deforming temperature, torque or pressure on the device. When necessary, the full, self-alignment mapping procedure can be run again to reset the baseline emitter and detector sets for each channel.

It will be readily apparent that fiber channels with multiple optical devices at each end, such as where being connected to transceiver arrays with uniformly distributed emitters and detectors, may have bi-directional capability for all or some channels. The fully defined physical alignment map provides the data necessary for selection, de-selection and control of the devices at each end of the link, enabling ASIC and remote control circuitry and software to manipulate both direction and performance of each channel, within the total capability of the devices associated with that channel.

It will be further apparent to those skilled in the art that the methodology can be extended to compound optical links having more than two connectors or nodes, where transmitters from one array may be linked with and communicating to detectors of two or more other arrays, or where detectors in one array may be linked to receive data from either of two or more transmitter arrays, or as may otherwise be required in variations of simplex, duplex, star and ring interconnect topologies.

Still other objects and advantages of the present invention will become readily apparent to those skilled in this art from the following detailed description, wherein we have shown and described only a preferred embodiment of the invention, simply by way of illustration of the best mode contemplated by us on carrying out our invention.

DESCRIPTION OF THE PREFERRED EMBODIMENT

The invention being susceptible of many embodiments, what follows is only a description of a preferred embodiment, and should not be construed as limiting of the invention.

Figure 1:
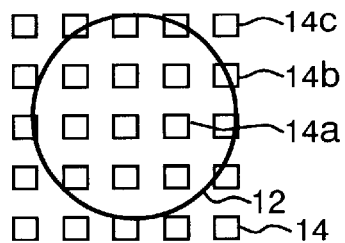
FIG. 1 illustrates a section of an optical link connector to optical array interface, the section limited to an optical fiber core end illumination cone or surface area overlaying a uniform array of optical detectors; some detectors clearly within the illumination area of the fiber core, some overlapping to some extent, and some being outside the fiber core illumination area.

Referring to FIG. 1, there is illustrated a section 10 of an optical link connector to optical array interface, the section limited to an optical fiber core end illumination cone or surface area 12 overlaying a uniform array of optical detectors 14; some detectors 14a clearly within the illumination area 12, some detectors 14B overlapping to some extent, and some detectors 14C being outside the fiber core illumination area.

For the purpose of this disclosure, the term "illumination area" is applicable to the cross section area of the cone of exposure on the optical planar array, of a channel end or fiber core end in an optical link terminal connector, for effectively receiving the output of optical transmitters on the optical planar array, as well as for illuminating photo detectors with optical signals from another node or end of the link.

FIG. 1 helps to explain a first preferred embodiment method for aligning a multi-channel optical light source or data communications link connector that is configured with channel terminations distributed across a planar connector face so as to provide some degree of spacing or buffer area between channel illumination cones for optical isolation between channels, to a planar optical array of photo detectors, such as an electro-optical array of p-i-n diodes that is flip-chip bonded to an ASIC substrate. The multi-channel light source or data communications link may be any sort of light source or optical data source or sources, whether individual to each channel or common to all channels; whether coming from one node or several nodes of the optical link. The method requires of the optical array of p-i-n-detectors, which may also be other present or novel types of photo detectors, that the array density of the detectors, when compared to the size of the channel illumination area, be sufficient to assure there will be a multiplicity of detectors within the illumination cone of each channel core, as is illustrated in FIG. 1. The invention further requires there to be common or coordinated control capability of the optical transmitters or light source, and the receivers, in order to conduct the embodiment described. While the method is most useful in the case of multi-channel optical link connections, it is applicable to any single or multi-channel case, where the alignment of optical devices of the planar optical array to the optical channel connector is indeterminate from the manner in which the connection was made.

As a preliminary step of this embodiment, the optical link connector is first physically mounted securely with minimal precision to the array, mainly assuring the full face of the connector is substantially overlapping the detector array so that each channel core end 12 is exposed to a multiplicity of detectors 14, the precise alignment of individual detectors to the connector being indeterminate at this point. The connector attachment means should be sufficient to keep Z-axis spacing and tilt parameters within normally usable tolerances. The automated self-alignment procedure of this embodiment can then be initiated.

Detectors 14 are first enabled electronically by their respective supporting circuitry and control software, such as may be found in the ASIC substrate to which an electro-optical array is mounted, so as to be responsive to light signals through the optical link, if received. A light source is then remotely applied to each channel of the optical link in turn for a period of time, causing a respective area 12 illumination of a limited number of detectors 14 in a different section of the array during each period of illumination. During each sequential illumination period, detectors indicating a response, necessarily from among detectors 14a and 14b for the respective channel, are cataloged by control circuitry and software as the detector set associated with or "aligned" with that channel core termination. Obviously, any faulty detectors from among the group of 14a and 14b detectors that are not responsive, will not be recorded as part of the aligned detector set.

A pre-determined or determinable threshold of intensity of response may be used by the supporting circuitry and software to de-select marginal detectors, such as the partially overlapping detectors 14b. There may be an additional sensing by the supporting circuitry of the intensity of individual detector responses, which may likewise be recorded for further channel use management, such as selecting specific single detectors or detectors in combination for total output strength, or for repairing the channel when a detector fails, or for fan-out capability where a received signal is being divided and processed in parallel for any of various reasons.

Figure 2:
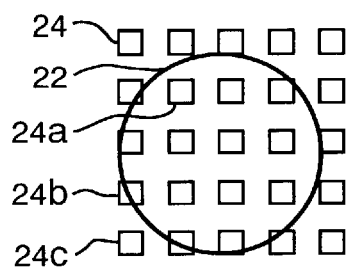
FIG. 2 illustrates a section of an optical link connector to optical array interface, the section limited to an optical fiber core end receiving cone or surface area overlaying a uniform array of VCSEL transmitters; some VCSELs clearly within the area of the fiber core, some overlapping to some extent, and some being outside the fiber core receiving area.

Referring to FIG. 2, there is illustrated a section 20 of an optical link connector to optical array interface, the section limited to an optical fiber core end receiving cone or surface area 22 overlaying a uniform array of VCSEL transmitters 24; VCSELs 24a being clearly within the area of the fiber core, VCSELs 24b overlapping area 22 to some extent, and VCSELs 24c being outside the fiber core receiving area 22.

FIG. 2 helps explain another preferred embodiment, the corollary method to the FIG. 1 embodiment, where the detectors of FIG. 1 are optical transmitters, and other aspects of the corollary explanation will be readily apparent to those skilled in the art. In summary, the connector having been physically connected in the non-critical manner described, the alignment method requires enabling a remote detection capability able to distinguish on which channel it was receiving. Then transmitters 24 are turned on sequentially, while the supporting circuitry and software records which transmitters where remotely detected, and on which channel. The several transmitters of the transmitter set associated with a particular channel are then defined as aligned. As previously described, the intensity of the received signal can likewise be measured, a threshold amount required to distinguish 24b transmitters and weak 24a transmitters from normal 24a transmitters, the 24c and non-functioning transmitters having not been recorded at all.

Again, similar to the FIG. 1 embodiment, the good transmitters of the FIG. 2 embodiment are then selectable and deselectable through supporting circuitry and software for various useful purposes. Also again, this embodiment requires a common or coordinated control capability within the supporting circuitry and software of the transmitters and the remote detection means for sensing an optical output in each channel, in order to conduct the alignment procedure described.

Figure 3:
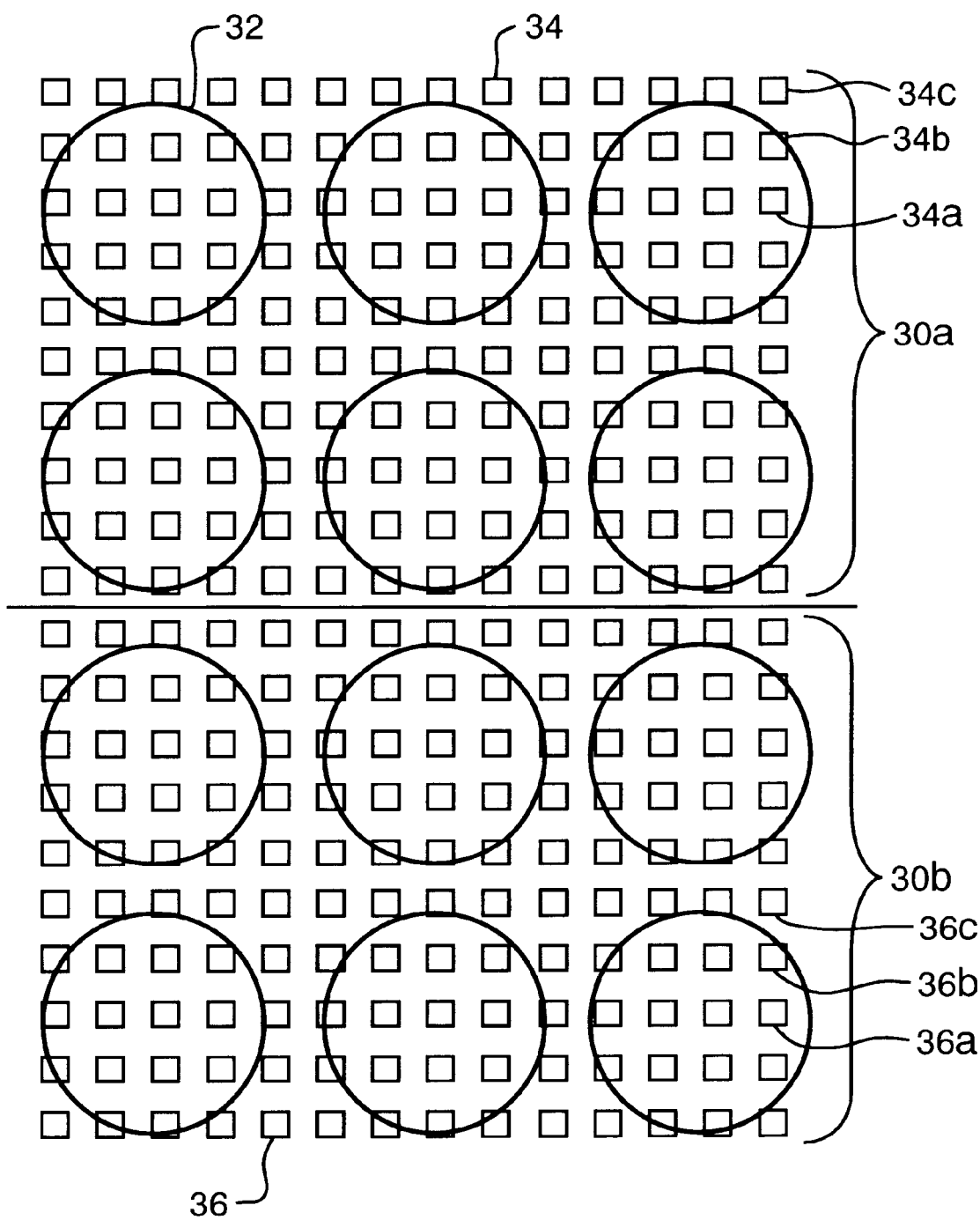
FIG. 3 illustrates a section of an optical link connector to optical array interface, the section limited to several adjacent optical fiber core end effective areas overlaying a uniform array of optical devices, where a subsection of the devices are VCSELs and the remaining subsection are p-i-n photo detectors; some devices clearly within the effective areas of their respective fiber cores, some overlapping one fiber core to some extent, and some being outside all fiber core areas.

Referring now to FIG. 3, there is illustrated a more complex embodiment of the invention, the alignment of both end connectors of an under sampled, multi-channel optical communications link between a transmitter subsection and a receiver subsection of a common chip. This embodiment is extendable to at least the cases of two different chips on the same ASIC substrate, or to two different electro-optical devices so long as there is a common or coordinated control capability for all transmitters and detectors through the supporting circuitry and software. More specifically, there is shown a section 30 of an optical link connector to optical array interface, the interface diagram showing several adjacent optical fiber core end effective areas 32 overlaying a uniform array of optical devices, where a subsection 30a of the devices are VCSELs 34 and the remaining subsection 30b are p-i-n photo detectors 36. Optical devices 34a and 36a are clearly within the effective areas of their respective fiber cores, devices 34b and 36b overlap a fiber core effective area 32 to some extent, and devices 34c and 36c are outside all fiber core areas.

Again, as in prior embodiments, the connector is physically attached with non-precession alignment, such as by 2-edge alignment as in FIG. 3, where the left side and lower edge of the core pattern and the optical device pattern coincide. However, as is readily apparent, the particular distribution of optical devices to channel cores is the result of the particular placement of this connector to this array. The range of non-precision placement of the connector to the array, as to lateral and rotational orientation, frequently results in quite different distributions from chip to the next, making any precise prediction of optical device to channel alignment, problematic at best.

The FIG. 3 embodiment method is a combination of the prior embodiment methods, requiring the steps of enabling all the subsection 30b detectors; turning on all of the transmitters in sequence; during the on period of each transmitter, scanning the detectors for response and recording the detector sets responding to each transmitter, and then matching detector sets to identify channels and transmitter sets associated with each channel so as to have a full alignment mapping of optical devices per channel. The same nuances of signal strength or intensity can be sensed and used for further logical selection and de-selection of transmitters and detectors for channel optimization and multi-node considerations, as previously described.

Figure 4:
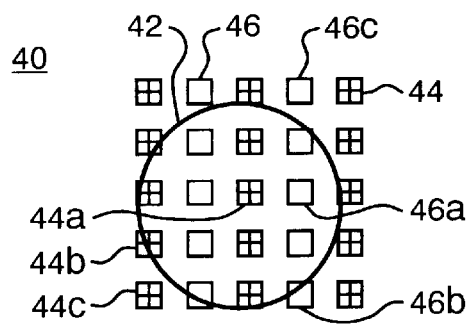
FIG. 4 illustrates a section of an optical link connector to optical array interface, the section limited to an optical fiber core end receiving cone or surface area overlaying a uniformed distributed array of VCSEL transmitters and p-i-n detector/receivers; some VCSELs and some detectors clearly within the area of the fiber core, some of each overlapping to some extent, and some of each being outside the fiber core receiving area.

Referring now to FIG. 4, there is illustrated a circumstance to which a further embodiment method is applicable, where a section 40 of an optical link connector to optical array interface, the section limited to an optical channel fiber core end illumination surface area 42 overlaying a uniformly distributed columnar array of VCSEL transmitters 44 and p-i-n detector/receivers 46. VCSELs 44a and detectors 46a are clearly within the channel core area 42, VCSELs 44b and receivers 46b are each overlapping area 42 to some extent, and VCSELs 44c and receivers 46c are outside the channel core receiving area 42. Again, there is a preliminary assumption that the connector is attached by non-precision means so that the precise alignment of optical devices to channels is uncertain. However, with alternating rows of transmitters and detectors, it will be readily apparent that there will be a multitude of each within each channel's core illumination area, providing the opportunity for bi-directional communication through each optical channel.

Assuming the other end or nodes of the optical link to be similarly configured and connected, and again assuming that there is common or shared control of the optical devices through supporting circuitry and software, the alignment methodology of the invention is conducted in the following manner. The detectors of all but a first node of the optical link are enabled. The transmitters of the first node are turned on in sequence. During the "on" period for each transmitter, the responding detectors at each node are recorded as detector sets associated with that transmitter. The detector sets are then matched to identify each channel and the transmitter set of the first node associated with that channel. The process is then repeated for each node of the optical link, until full alignment mapping of optical devices per channel is accomplished. Again, the same nuances of signal strength or intensity can be sensed and used for further logical selection and de-selection of transmitters and detectors for channel optimization, selecting direction of transmission, and multi-node considerations.

Irregular or intentional alterations in the above described configurations may likewise be addressed by the alignment method of the invention. For example, normally the channel illumination areas as projected onto the optical array face are segregated by a zone of non-illumination that will prevent some optical devices from being useful. In the opposite case, whether calculated or unintentional, there may be overlapping channel end illumination areas where one or more optical devices may appear in the device sets of two adjacent channels. Upon completion of the alignment procedures of the invention, these optical transmitters or detectors will be readily ascertainable, and can be either de-selected, or exploited for cross-channel utilization of various sorts.

Another example of the invention includes a method for aligning the optical transmitters of an optical planar array to the channels a multi-channel optical link connector attached to the planar array, where the method includes the steps of employing a connector and optical array configuration in which a multiplicity of transmitters will be within the illumination area of each channel when connected, employing responsive means for optical detection at a remote end of each channel of the optical link, and using supporting circuitry and software that has control of the transmitters and the means for optical detection. Then enabling the means for optical detection at each said channel, turning on a first transmitter for a period of time, and during that period of time, recording which of the channels for which the means for optical detection is responding to the first transmitter, this transmitter being thereafter associated with that channel. Then repeating the steps of turning on and recording receivers for each additional transmitter in sequence, all the transmitters associated with a common channel defining a channel-specific transmitter set, thus establishing the alignment of all useful transmitters and transmitter sets to a respective channel of the connector. An optical transmitter may be of any type that emits radiation when given the proper electrical input. It may be a VCSEL, an LED (light emitting diode), or a pn junction device, or other radiation emitter that can be fabricated in quantity as a two dimensional planar array. The optical link connector may be an end connector or a nodal termination connector for an optical data communications link.

A further example of the invention is method for aligning the optical receivers of an optical planar array to the channels of a multi-channel optical link connector attached to the planar array, where the method includes the steps of using a connector and optical array configuration in which a multiplicity of the receivers will be within the illumination area of each channel when connected, employing a light signal source for input at a remote end of each channel of the optical link, and using supporting circuitry and software that has control of the receivers and the light signal source. Then enabling the receivers for responding to light detection, and turning on the light signal source of a first channel for a period of time. Then during that period of time, recording which of the receivers is responding to the first channel, all such receivers defining a receiver set aligned with the first channel. Then repeating the steps of turning on and recording responses for each additional channel in sequence, thereby establishing the alignment of all useful receivers and receiver sets to respective channels of the connector. An optical receiver can be of any type that measures or converts the energy of incident radiation into a useful other energy, particularly electrical. Suitable receivers may be p-i-n diode detectors, photovoltaic or photo conductive devices or other light sensitive opto-electronic devices that can be fabricated in quantity as a two dimensional array. The optical link connector may be an end connector or a nodal termination connector for an optical data communications link.

A yet further example of the invention is a method for aligning at each connection, the channels of a multi-channel optical link to the optical devices of the respective optical planar array of the connection. The method entails employing a connector and optical array configuration at each connection in which a multiplicity of the optical devices will be within the illumination area of each channel for each said connector, and employing supporting circuitry and software that has control of all the optical devices of at least two of the connections of the optical link, where the optical devices are transmitters and receivers. Then enabling all the receivers for responding to a transmitted light signal, turning on the first transmitter of the first connection for a period of time. Then during the period of time, recording which of the receivers is responding to the first transmitter; all of the receivers responding to the first transmitter defining a receiver set which is thereafter associated with the first transmitter of the first connection. Then repeating these steps for each additional transmitter of the first connection in sequence, and comparing which receiver sets are a close match, having the same or nearly the same receivers. The associated transmitters of the matching receiver sets define an associated transmitter set with an optical channel between the transmitter set and its respective matching receiver sets. Then repeating the steps for each additional connection in sequence, the result being a complete alignment mapping of the optical link and all its nodes or connections.

The optical link may be a fiber optic bundle. The multi-channel optical link may be a uni-directional or bi-directional optical data communications link with two end nodes or with multiple nodes as in a ring or star topology.

As will be realized, the invention is capable of other and different embodiments, and its several details are capable of modifications in various obvious respects, all without departing from the invention. The objects and advantages of the invention may be further realized and attained by means of the instrumentalities and combinations particularly pointed out in the appended claims. Accordingly, the drawing and description are regarded as illustrative in nature, not as restrictive.

We claim:

1. A method for aligning the optical transmitters of an optical planar array to the channels a multi-channel optical link connector attached to said planar array, comprising the steps employing a connector and optical array configuration in which a multiplicity of said transmitters will be within the illumination area of each said channel when connected, employing responsive means for optical detection at a remote end of each said channel of said optical link, employing supporting circuitry and software having control of said transmitters and said means for optical detection, enabling said means for optical detection at each said channel, turning on a first said transmitter for a period of time, during said period of time, recording which of said channels for which said means for optical detection is responding to said first said transmitter, said transmitter being thereafter associated with said channel, repeating said steps of turning on and recording which of said channels for each additional said transmitter in sequence, all said transmitters associated with a common said channel defining a transmitter set, alignment of all said transmitter sets to a respective said channel being thereby established.

2. A method for aligning the optical transmitters of an optical planar array to the channels a multi-channel optical link connector according to claim 1, said transmitters being VCSELs.

3. A method for aligning the optical transmitters of an optical planar array to the channels a multi-channel optical link connector according to claim 1, said optical link connector being a nodal termination connector for an optical data communications link.

4. A method for aligning the optical receivers of an optical planar array to the channels of a multi-channel optical link connector attached to said planar array, comprising the steps:

employing a connector and optical array configuration in which a multiplicity of said receivers will be within the illumination area of each said channel when connected, employing a light signal source for input at a remote end of each said channel of said optical link, employing supporting circuitry and software having control of said receivers and said light signal source, enabling said receivers for responding to light detection, turning on said light signal source of a first said channel for a period of time, during said period of time, recording which of said receivers is responding to said first said channel, all such said receivers defining a receiver set aligned with said first said channel, repeating said steps of turning on and recording responses for each additional said channel in sequence, alignment of all said receiver sets to respective said channels being thereby established.

5. A method for aligning the optical receivers of an optical planar array to the channels a multi-channel optical link connector according to claim 4, said optical link connector being a nodal termination connector for an optical data communications link.

6. A method for aligning the optical receivers of an optical planar array to the channels a multi-channel optical link connector according to claim 4, said receivers being p-i-n diode detectors.

7. A method for aligning at each connection the channels of a multi-channel optical link to the optical devices of the respective optical planar array of each said connection, comprising the steps:

(a) employing a connector and optical array configuration at each said connection in which a multiplicity of said optical devices will be within the illumination area of each said channel for each said connector, (b) employing supporting circuitry and software having control of all said optical devices of at least two said connections of said optical link, said optical devices being transmitters and receivers, (c) enabling all said receivers for responding to a transmitted light signal, (d) turning on a first said transmitter of a first optical array for a period of time, (e) during said period of time, recording which of said receivers is responding to said first transmitter of said first connection, all of said receivers responding to said first transmitter defining a receiver set thereafter associated with said first transmitter, (f) repeating steps (d) and (e) for each additional said transmitter of said first connection in sequence, (g) comparing said receiver sets for matching receiver sets, the associated said transmitters of said matching receiver sets defining a transmitter set of said connection associated with a said optical channel there between, (h) repeating steps (c) through (h) for each additional connection.

8. A method for aligning at each connection the channels of a multi-channel optical link according to claim 7, said optical link being a fiber optic bundle.

9. A method for aligning at each connection the channels of a multi-channel optical link according to claim 7, said transmitters being VCSELs.

10. A method for aligning at each connection the channels of a multi-channel optical link according to claim 7, said receivers being p-i-n diode detectors.

11. A method for aligning at each connection the channels of a multi-channel optical link according to claim 7, said optical link being a data communications link between two sections of a planar optical array.

12. A method for aligning at each connection the channels of a multi-channel optical link according to claim 7, said optical link being a data communications link between two planar arrays on a common ASIC substrate.

13. A method for aligning at each connection the channels of a multi-channel optical link according to claim 7, said optical link being a data communications link between two discrete electronic devices.

14. A method for aligning at each connection the channels of a multi-channel optical link according to claim 7, said optical link being a multi-nodal data communications link.

15. A method for aligning at each connection the channels of a multi-channel optical link according to claim 7, said optical link being a bi-directional data communications link.

* * * * *